United States Patent [19]
Hunter, II

[11] 3,872,291

[45] Mar. 18, 1975

[54] FIELD REPAIRABLE MEMORY SUBSYSTEM

[75] Inventor: John Carpenter Hunter, II, Phoenix, Ariz.

[73] Assignee: Honeywell Information Systems Inc., Waltham, Mass.

[22] Filed: Mar. 26, 1974

[21] Appl. No.: 454,880

[52] U.S. Cl. .................... 235/153 AK, 235/153 AM

[51] Int. Cl. ........................ G11c 29/00, G06f 11/00

[58] Field of Search 235/153 AM, 153 AC, 153 AK; 340/172.5, 173 R, 173 AM

[56] References Cited

UNITED STATES PATENTS

| | | | |
|---|---|---|---|
| 3,633,175 | 1/1972 | Harper | 340/172.5 |
| 3,681,757 | 8/1972 | Allen et al. | 340/172.5 |
| 3,753,235 | 8/1973 | Daughton et al. | 340/172.5 |
| 3,755,791 | 8/1973 | Arzubi | 340/173 R |
| 3,772,652 | 11/1973 | Hilberg | 235/153 AM |
| 3,803,560 | 4/1974 | DeVoy | 340/172.5 |

*Primary Examiner*—Charles E. Atkinson
*Attorney, Agent, or Firm*—Walter W. Nielsen; Edward W. Hughes

[57] ABSTRACT

A block-addressable mass memory subsystem comprising wafer-sized modules of LSI semiconductor basic circuits is disclosed. The basic circuits are interconnected on the wafer by non-unique wiring bus portions formed in a universal pattern as part of each basic circuit. A disconnect line is provided as part of the interconnecting bus. A variable address storage register is provided for each basic circuit. An inhibit chain interconnects all the basic circuits, whereby one and only one basic circuit is responsive to store a unique address in its address storage register. Basic circuits, discovered to be defective in the field through error detection and correction techniques, may be disconnected from the memory subsystem by maintenance personnel through the transmission of a disconnect signal over the disconnect line to the defective basic circuit. Disconnected basic circuits are automatically functionally eliminated from the memory subsystem, since the inhibit chain links only good basic circuits.

8 Claims, 5 Drawing Figures

FIELD REPAIRABLE MEMORY SUBSYSTEM

CROSS-REFERENCE TO RELATED APPLICATIONS

This application is related to U.S. patent applications Ser. No. 307,317, filed Nov. 21, 1972, and now U.S. Pat. No. 3,803,562 entitled "Semiconductor Mass Memory," Ser. No. 317,971, filed Dec. 26, 1972, and now U.S. Pat. No. 3,813,650 entitled "Method For Fabricating and Assembling A Block-Addressable Semiconductor Mass Memory," Ser. No. 439,459, filed Feb. 4, 1974, entitled "Multiple Register Variably Addressable Semiconductor Mass Memory," and Ser. No. 439,677, filed Feb. 4, 1974, entitled "Variably Addressable Semiconductor Mass Memory," all by John C. Hunter, and all assigned to the assignee of the present invention.

BACKGROUND OF THE INVENTION

The invention relates generally to a memory subsystem for a data processing system, and more particularly, to a field-repairable store, in which basic units or arrays of store which are determined to be defective may be selectively disconnected from the store. A method of repairing a memory subsystem connected to a data processing system is also disclosed.

To maintain the operational integrity of data processing hardware, it is often necessary to make costly replacements of equipment or portions thereof which are found to be defective during the course of data processing operations. With the increased use of large scale integrated (LSI) circuits in the logic and memory units of data processing systems, the ease and rapidity with which defective components may be replaced takes on ever greater importance.

For example, in a memory subsystem employing LSI circuits, the density of the basic memory units is very high, as hundreds and thousands of basic memory storage units are provided for each LSI circuit of a size ranging from half an inch to three inches across. Moreover, the packaging density of such circuits is very high, making the removal and replacement of a single LSI circuit substrate relatively difficult.

When a defective memory unit has been identified in the field, through the use of standard Error Detection And Correction (EDAC) techniques and equipment, it is desirable to have the ability to service the memory subsystem as fast and as easily as possible.

The present invention, according to a preferred embodiment, provides a method and apparatus for selectively disconnecting basic memory units which are identified as defective in the course of data processing operations. The disconnection operation is performed virtually instantaneously. It is unnecessary to physically access the memory unit, or to remove it, or to repair it. Accordingly, the present invention significantly reduces the cost associated with the fabrication and maintenance of data processing memory subsystems. It has been estimated that thirty-five percent of all failures of data processing equipment occur as a result of failures within the main memory. The cost associated with repairing main memory components increases geometrically between the time that such components are subjected to initial incoming inspection prior to incorporation into the memory subsystem, and the time when component failures are identified in the field. For example, using the figure of one dollar as a base representing the cost of replacing or repairing a defective component during prefabrication inspection, the cost of repairing or replacing such component after it has been incorporated into a memory subsystem is approximately five dollars. If the component is determined to be defective in the course of routine memory subsystem tests prior to shipment to a customer, the cost of replacement or repair is approximately twenty dollars. The cost of replacing or repairing a memory component when it has been identified as defective in the field jumps to approximately $100, because of the costs associated with on-site repair or the necessity to ship the portion of the memory subsystem containing the defective basic unit back to the factory for repair. As will be seen below, the present invention solves the problem of costly and time-consuming on-site or off-site repair of a malfunctioning memory subsystem. In addition, the present invention may reduce the cost associated with fabrication of a memory subsystem, by reducing the testing of the basic memory units prior to their incorporation into the memory subsystem proper.

The present invention, according to a preferred embodiment thereof, provides a plurality of basic storage units or arrays interconnected by a common bus carrying data signals, control signals, address signals, and a selectively transmittable disconnect signal. Each basic memory unit has associated with it an address register to which may be assigned a unique address during online data processing operations. Data may be written into and read out of the basic memory units under the control of the common bus control signals. Each basic memory unit also has associated with it a fuse-like disconnection means. When a particular basic memory unit has been identified as defective, it may be functionally disconnected from the memory subsystem by the application of a disconnect signal to the disconnection means of the basic memory unit over the disconnect line of the common bus.

An inhibit chain links all of the basic memory units comprising one "assembly" of the memory subsystem. The function of the inhibit circuitry is to enable one and only one address register, associated with a particular basic memory unit, within an "assembly" to store a unique address received during on-line data processing operations. Because each basic memory unit may be assigned and reassigned a unique memory address, the disconnection of a basic memory unit from an assembly does not leave a "hole" in the address space of the assembly, provided that spare basic memory units exist within each assembly. Thus when a basic memory unit has been disconnected, the memory address previously assigned to that unit may be reassigned to a spare basic memory unit. In this way the full address space of the memory subsystem is maintained, even though a number of basic memory units may have been disconnected from the memory subsystem over a period of time, due to their failure in on-site data processing operations.

The ability to selectively disconnect defective basic memory units combined with the ability to automatically replace defective basic memory units with spare units provides substantial savings of time and money regarding the fabrication, maintenance, and repairability of the memory subsystem.

OBJECTS OF THE INVENTION

Accordingly, it is a principal object of the present invention to provide a repairable memory subsystem for use in a data processing system.

It is another object of the invention to provide in a data processing system a memory store in which basic memory units which have been determined to be defective may be disconnected.

Another object of the invention is to provide a memory store which is quickly and easily repairable in the field.

A further object of the invention is to provide a memory store in which basic memory units which have been determined to be defective may be selectively disconnected without damage to the integrity of the memory store.

Yet another object of the invention is to provide a memory store for a data processing system wherein the active basic memory units may each be assigned and reassigned unique addresses, and wherein any basic memory unit may be disconnected in the field from the entire memory store, should it be determined to be defective.

These and other objects are achieved according to one aspect of the invention by providing a memory subsystem in which a plurality of LSI memory arrays interconnected by a common intrinsic bus are fabricated on an uncut wafer of semiconductor material. Each array contains a variably addressable address register for storing a unique address assigned to the array by the data processing system during the course of data processing operations. An inhibit circuit links all arrays on all wafers within an assembly, so that from the pool of unassigned arrays, one and only one array is responsive to store a unique assigned address. A disconnection device is associated with each array. The disconnection device is actuated by the selective transmittal of a disconnect signal over a disconnect line formed as part of the common bus. The application of the disconnect signal to the disconnect device of an array which has been determined to be defective functionally removes the defective array from the assembly. The defective array can no longer be assigned an address; however, a replacement array is automatically brought in to replace the "hole" in the address space left by the disconnected defective array.

BRIEF DESCRIPTION OF THE DRAWING

The invention will be described with reference to the accompanying drawing, wherein.

DESCRIPTION OF THE PREFERRED EMBODIMENT

Figure 1:
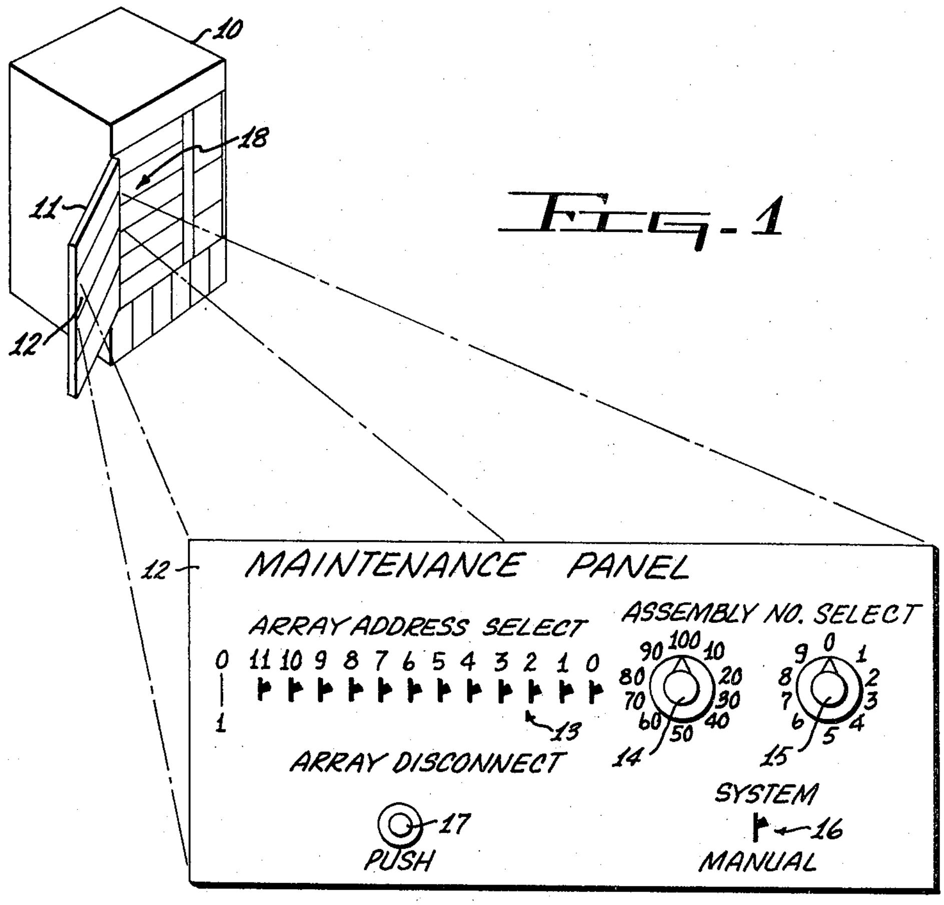
FIG. 1 is a perspective representation of a memory subsystem equipment storage cabinet, including an enlarged representational view of a maintenance panel thereof.

Referring now to the drawing, and in particular to FIG. 1, there is shown a perspective representation of an equipment cabinet 10 for a data processing memory subsystem containing a plurality of memory modules 18. Within the main memory subsystem organization, a plurality of memory modules, each containing a different number of operative basic memory units or arrays, are combined into an assembly. The memory subsystem contains a plurality of assemblies equal in number to the address bandwidth of the memory subsystem. For example, if the address bandwidth of the system is 36 (i.e., an address space of $2^{36}$), then the memory subsystem comprises at least 36 assemblies. For a particular 36-bit word, each bit is stored in a different array of each assembly. For example, bit 1 is stored within a particular array of assembly 1, bit 2 is stored within a particular array of assembly 2, and so forth. Reference may be had to the above-mentioned U.S. patent applications Ser. No. 439,677 and 439,459 for details of the memory subsystem organization.

Referring again to FIG. 1, a hinged door 11, containing a maintenance panel 12, is shown. Utilizing this maintenance panel 12, a computer repairman may in the field select and disconnect a basic memory unit or array which has been determined to be defective. In the course of normal data processing operations, known EDAC and/or memory subsystem diagnostic techniques are utilized to identify defective or malfunctioning arrays. Thus, for example, when an error is detected in a particular bit position during the transmission or reading out of data stored in the memory subsystem, the computer may print out a statement that an error has occurred in the transmission of data from a particular array and assembly, identifying the array and assembly by number. A request for retransmittal of the data may be made in order to assess whether the error occurred in the storage or in the transmittal of the data. Once it has been positively determined that the error is attributable to a defective memory array, a computer service representative can functionally disconnect the defective array from the memory subsystem. To this end, the bank of Array Address Select toggle switches 13, the Assembly Number Select dials 14 and 15, and the Array Disconnect push-button 17 are provided.

The service representative or person responsible for system maintenance switches the memory subsystem from automatic to manual operation using toggle switch 16. The assembly in which the defective array is located is next selected by setting the Assembly Number Select rotary switches 14 and 15 to the proper assembly number. Using conventional analog-to-digital conversion apparatus, a binary number is generated representing the higher order, assembly number bits corresponding to the defective array. The specific location of the defective array within the selected assembly is selected by utilizing the bank 13 of Array Address Select toggle switches. The twelve low-order array address bits are selected by setting the twelve toggle switches in bank 13 to positions representing 0 or 1, such that the selected combination of 0 and 1 settings represents the twelve-bit low-order portion of the address of the defective array. When the low-order and high-order bits of the array address have been selected, the Array Disconnect push-button switch 17 is depressed to transmit a −50 volt disconnect pulse over the common bus interconnecting all of the memory arrays. Only the addressed array is receptive to the disconnect pulse and is permanently disconnected from the memory subsystem.

It will be understood that equivalent address selection apparatus may be employed to generate the specific address of the array which is known to be defective. It is also within the scope of this invention for the address of the defective array to be generated automatically by the data processing system acting in response to the EDAC system, and for the memory array disconnect pulse to be automatically generated and transmitted by the data processing system itself. Thus, it becomes apparent that the computer system is capable on its own of detecting and eliminating faulty memory arrays within its memory subsystem, thereby totally eliminating the necessity for human intervention.

Figure 2:
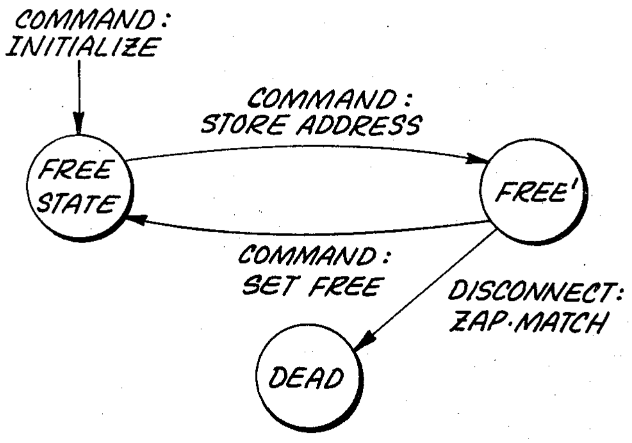
FIG. 2 is a diagram depicting the possible states which a memory array of the memory subsystem may assume.

Referring now to FIG. 2, a diagram is shown depicting the possible states which a memory array within the memory subsystem of the present invention may assume. There are two active states, the FREE state and the FREE′ state, which an array may assume during normal operations. The third state, DEAD, is the disconnected state from which no return is possible. As shown in FIG. 2, and described more particularly in the above-referenced Pat. application Ser. No. 439,677, the INITIALIZE command places all good arrays in the FREE state. All FREE arrays are linked together by the inhibit chain such that one and only one array at the "top" of the inhibit chain is capable of responding to a STORE ADDRESS command, which command enables such array to store a unique address assigned to it by the data processing system. Once an array has been assigned a unique address in response to the STORE ADDRESS command, the internal state of the array is changed to FREE′. The array simultaneously drops its inhibit control over arrays which are lower in the chain, thus allowing the next lower array in the inhibit chain to respond to a STORE ADDRESS command.

From the FREE′ state, in which the array has been assigned a unique address, the array state may be changed to one of two possible other states. If the array is normal and is functioning properly, it may be returned to the FREE state at any time during the course of data processing operations by transmitting to it the SET FREE command. The SET FREE command returns the array to the FREE state, whereupon the array rejoins the inhibit chain. The array may subsequently be reassigned another unique address in the manner described above.

When an array in the FREE′ state has been determined to be defective for any reason, as for example by its failure to correctly read back data which has been written into it, such array may be disconnected and placed in the DEAD state. This is accomplished in two steps: (1) The defective array is first addressed in the usual way (i.e., the array address is transmitted over the address lines of the common interconnecting bus, and the array responds by generating an internal MATCH signal, indicating that the transmitted address corresponds exactly with the address stored in its address register), and (2) a −50 volt disconnect signal (ZAP signal) is applied over the disconnect line of the common interconnecting bus. An array may be disconnected only when the ZAP and MATCH signals temporally coincide. The details of disconnecting a defective array according to one embodiment of the invention are set forth below in the description regarding FIGS. 3 and 4.

Figure 3A:
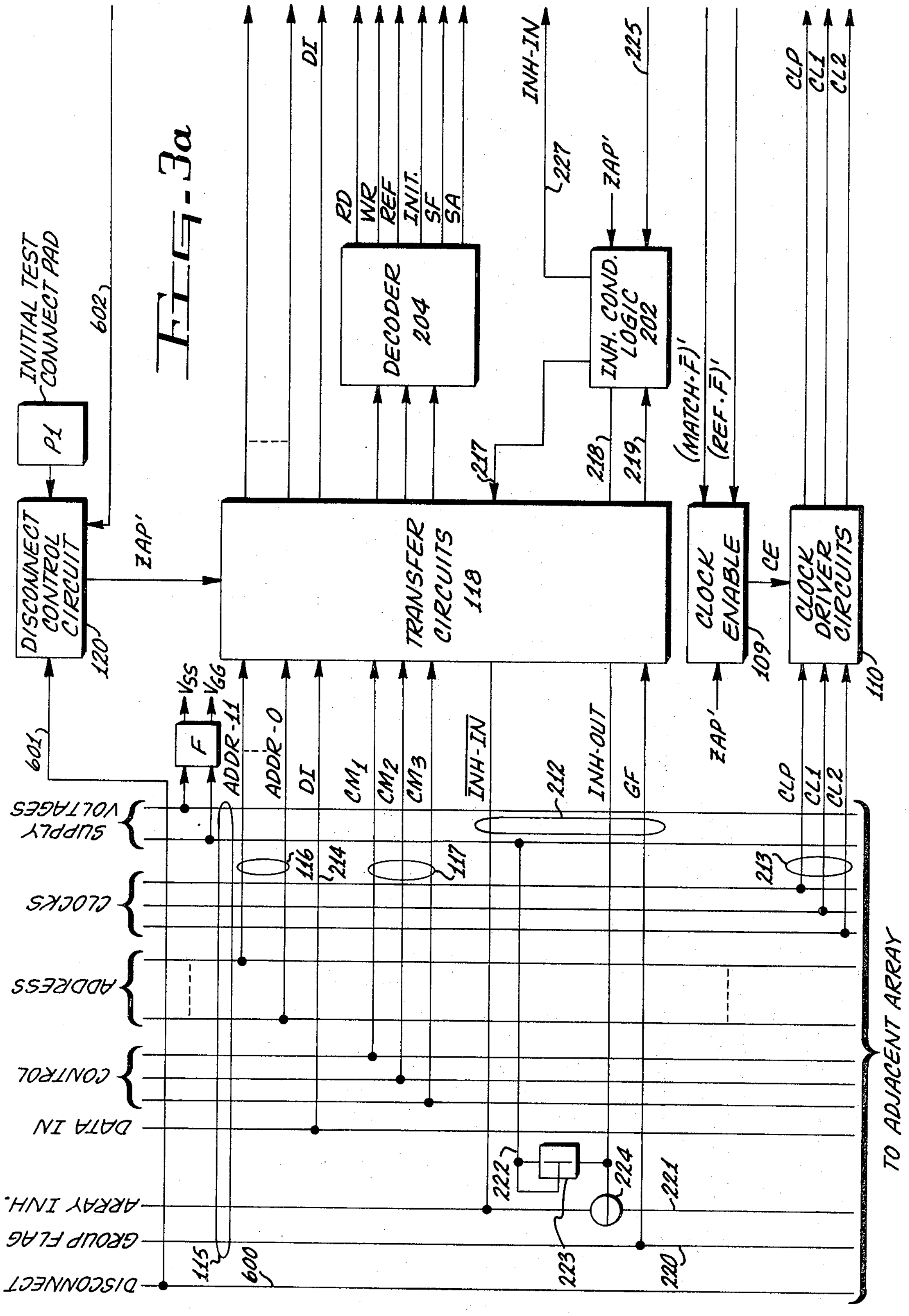
FIG. 3 comprised of FIGS. 3*a* and 3*b*, is a generalized schematic block diagram of an array.
Figure 3B:
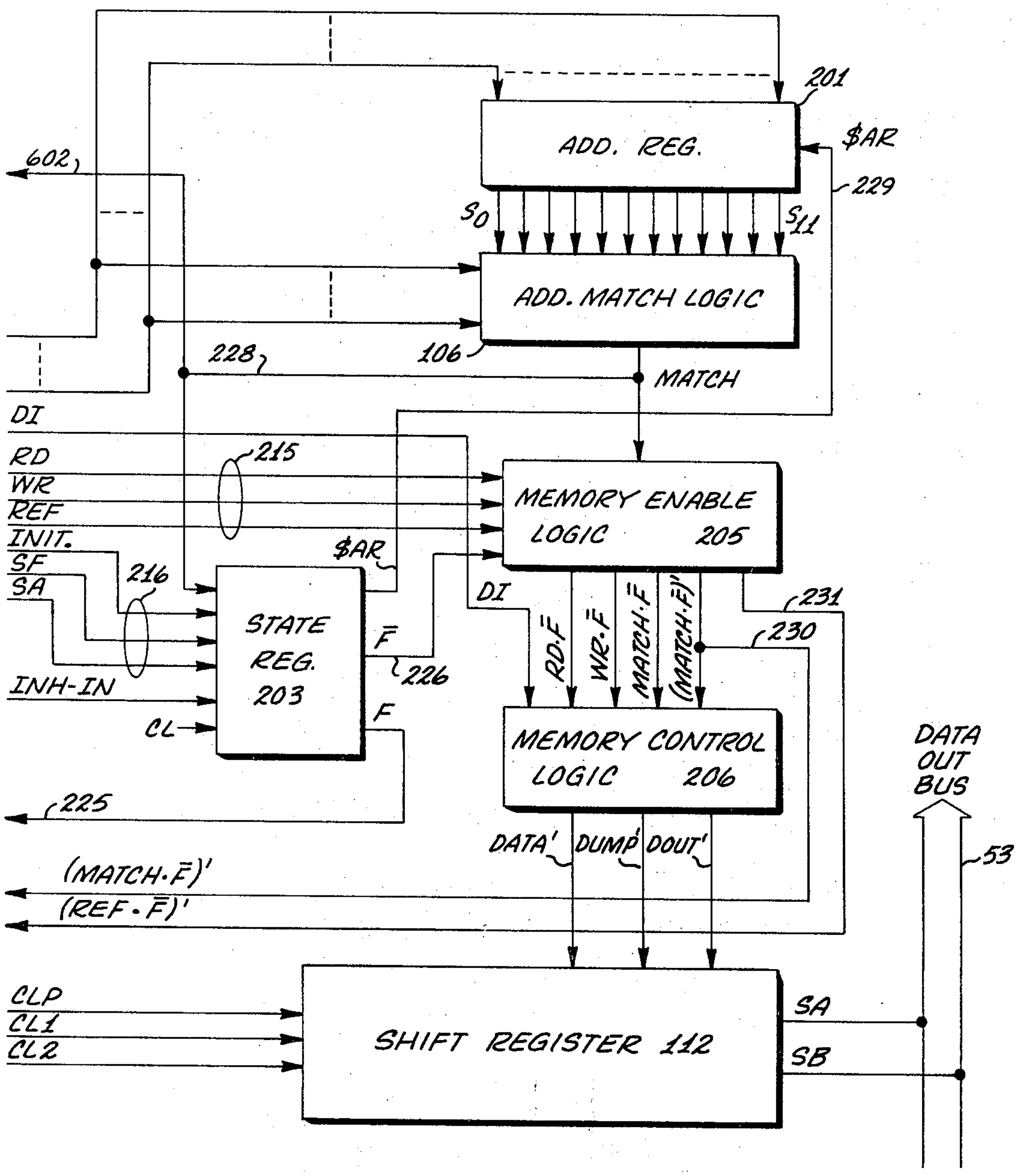

FIG. 3 represents a generalized schematic block diagram of an array within the memory subsystem of the present invention according to a preferred embodiment of same. The depicted array is similar to that described in the above-referenced U.S. Pat. application Ser. No. 439,677, but it should be understood that the present invention is not limited to a particular type of memory array or subunit of store. Any memory subsystem comprising a plurality of memory arrays which are capable of being assigned and reassigned unique addresses can potentially incorporate the field disconnect circuitry of the present invention.

Referring now to FIG. 3, the common interconnecting bus may be seen at the left-hand side of the figure, comprising various data, address, clock, voltage supply, and control lines. Lead lines enter the array at right angles to the lines of the common interconnecting bus. The majority of these lead lines pass through the Transfer Circuits 118, from whence they are connected to various internal circuits of the array. The Disconnect Control Circuit 120, is connected to the disconnect line 600 of the central bus via lead 601. Responsive to a disconnect signal transmitted over lines 600 and 601, the Disconnect Control Circuit 120 switches off the Transfer Circuits 118, preventing the transmittal of signals between the common bus and the internal circuitry of the array. Although the clock leads are shown to have a separate transfer circuit 109, the clock lines may be connected to the internal circuitry of the array through the Transfer Circuits 118.

The internal array circuitry and the operation of same form no part of the disclosure of the present invention and are fully described in the above-referenced U.S. Pat. applications. The operation of a preferred embodiment of the invention will now be described with reference to FIGS. 3 and 4.

When the array shown in FIG. 3 has been fabricated, it may be subjected to an initial test as part of a functioning memory subsystem prior to shipment of the memory subsystem to a customer. The array is initially assigned a unique address, which is stored in address register 201. When this unique address is retransmitted to the array over the central bus, the array will internally generate a MATCH signal through the Address Match Logic 106. The MATCH signal is transmitted to the Memory Enable Logic 205, and is further transmitted over line 228 to State Register 203, and over line segment 602 to the Disconnect Control Circuit 120. The addressed array may now read and write data into and out of Shift Register 112, under control of READ and WRITE control signals applied to the array over command leads 117. If the array functions properly, a voltage signal is applied to Initial Test Connect Pad P1, semi-permanently turning on the Transfer Circuits 118 in a manner to be described in further detail below. If, on the other hand, the array is determined to be defective, no signal is applied to pad P1, and the array is left in the disconnected or DEAD state.

Once the array has been turned on and forms part of a functioning memory subsystem, it may be selectively disconnected from the memory subsystem at any time by the transmission of a disconnect signal over disconnect lead 601 to the Disconnect Control Circuit 120. Once the defective array has been positively identified through standard EDAC and/or diagnostic techniques, it may be manually addressed by a service representative, as described with reference to FIG. 1 above, and a disconnect signal may be applied to it to permanently disconnect it from the memory subsystem.

Figure 4:
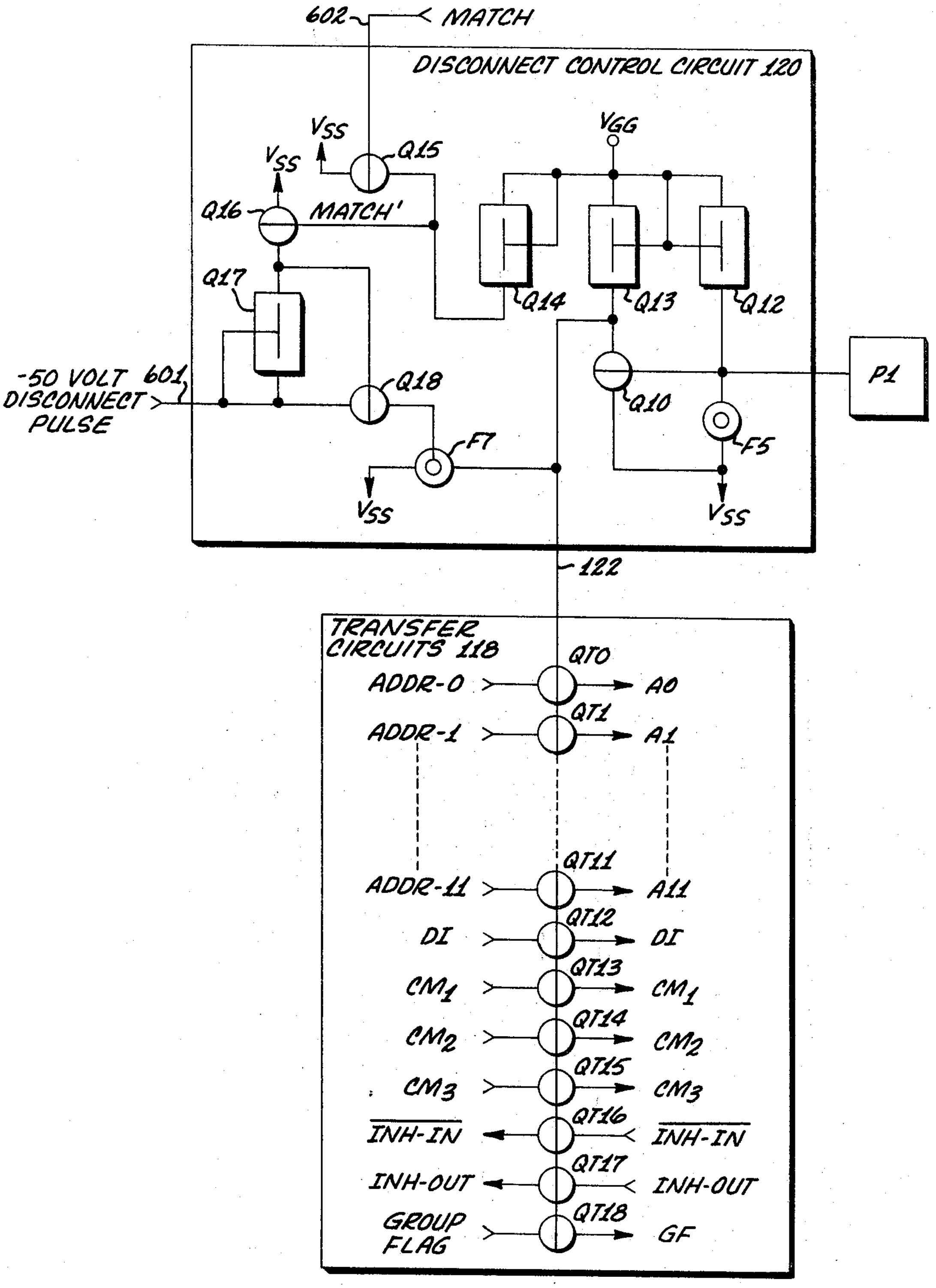
FIG. 4 is a detailed schematic diagram of the Disconnect Control Circuit and the Transfer Circuits of FIG. 3.

With reference to FIG. 4, a detailed schematic diagram of the Disconnect Control Circuit 120 and the Transfer Circuits 118 of FIG. 3 are shown. Initial Test Connect Pad P1 is connected to the drain of a floating gate device F5. Floating gate F5 is normally off (i.e., no charge on the gate) at the time the array is tested after wafer manufacture. With F5 off, $V_{GG}$ potential (less the drop through load transistor Q12) is applied to the gate of Q10. Q10 conducts enabling a ZAP signal level (logical 0) on the drain of Q10. The Q10 drain is connected to a polysilicon run 122, which forms the gates of switching transistors QT0–QT18. The ZAP signal disables QTO–QT18, preventing the transfer of signals between the central bus and the array through the Transfer Circuits 118.

During array testing, $V_{SS}$ potential is temporarily applied via probe pad P1 to the gate of Q10 turning Q10 off and applying $V_{GG}$ potential less the load Q13 drop (ZAP' enable signal) to the gates of QT0–QT18. With the Transfer Circuits QT0–QT18 enabled, the Address Match Logic 106 (FIG. 3) will respond to an all 0 ($V_{SS}$ potential) address on the ADDRO-11 address lines, and data can be written, read back, and compared to test the array. Upon determining the array good, an avalanche charge is applied to probe pad P1, injecting electrons onto the floating gate of transistor F5, turning it on. Q10 is turned off by F5 conducting and a semipermanent ZAP' enable signal is applied to the gates of transfer transistors QT0–QT18. At the same time the separate clock enable circuit 109 (FIG. 3) may be activated, allowing clock signals to be transmitted to the interior of the array.

If the array is determined to be defective in the field, the field disconnect circuitry on the left-hand side of Disconnect Control Circuit 120 is utilized to functionally disconnect the defective array from the memory subsystem. The floating gate device F7 is normally off after wafer manufacture. With F7 off, $V_{GG}$ potential (less the drop through load transistor Q13) (ZAP' enable signal) is normally applied to the gates of transfer transistors QT0–QT18. When F7 is turned on by the transmittal of a −50 volt disconnect pulse, the $V_{GG}$ potential is shunted to ground, turning off the transfer transistors QT0–QT18, thereby preventing the transfer of signals between the common bus and the interior of the array.

F7 is turned on only by the coincidence of the disconnect pulse and a MATCH signal (ZAP·MATCH). The logic circuitry for effectuating the ZAP·MATCH condition comprises transistors Q14–Q18. The channel length of transistors Q16–Q18 should be of sufficient length to prevent the breakdown of these transistors at −50 volts. A disconnect signal will turn on F7 only if transistor Q18 is conductive (i.e., the −50 volt signal is applied via load transistor Q17 to the gate of transistor Q18). When the disconnect signal is applied to an array having an internal address which does not correspond to the address transmitted during a disconnect operation, a MATCH' signal is applied to the gate of transistor Q16, thereby blocking the −50 volt disconnect signal and preventing transistor Q18 from turning on. The MATCH' signal is normally generated by load transistor Q14, assuming that a MATCH signal is not being generated by the Address Match Logic 106 and transmitted over line segment 602 to transistor Q15 of the Disconnect Control Circuit 120. In the absence of a MATCH signal, $V_{GG}$ potential less the drop through transistor Q14 is applied as the MATCH' signal to transistor Q16.

When the address signal transmitted over the common bus during a disconnect operation corresponds exactly with the address stored in the Address Register 201 in the depicted array, the internal MATCH signal is transmitted over line segment 602 to the gate of transistor Q15, making Q15 conductive and shunting the $V_{GG}$ potential to ground. Simultaneously, the MATCH' signal applied to Q16 goes to zero, making Q16 nonconductive. When the −50 volt disconnect signal is transmitted over lead 601 to the Disconnect Control Circuit 120, Q17 turns on Q18, allowing Q18 to conduct the disconnect signal to F7. F7 is thereby permanently turned on, and switching transistors QT0–QT18 of the Transfer Circuits 118 are permanently switched off.

With the switching-off of Transfer Circuits 118, inhibit signals (INH-IN', INH-OUT, and GROUP FLAG) are blocked from entering or leaving the array. Switching transistor 224 in the array inhibit line (FIG. 3) remains permanently on and the array remains permanently disconnected from the inhibit circuitry, so that it does not inhibit the operation of FREE arrays in the inhibit chain below it.

It will be apparent to those skilled in the art that the disclosed Field Repairable Memory Subsystem may be modified in numerous ways and may assume many embodiments other than the preferred form specifically set out and described above. For example, the initial testing of arrays after fabrication may be dispensed with, and all arrays may be initially activated (i.e., F5 turned on; or alternatively F5, Q10, Q12, and pad P1 removed from the Disconnect Control Circuit 120 entirely), and the memory subsystem may be tested solely in conjunction with the operating data processing system. According to this manner of array testing, the data processing system is programmed to sequentially address arrays within the memory subsystem, write data into the arrays, and read out such data to determine which arrays are defective. A listing of defective arrays can be generated, from which such arrays may be eliminated from the memory subsystem either manually or automatically by the data processing system. In this manner, a large portion of the costs associated with array testing can be eliminated, thus significantly reducing the per-bit cost of the memory subsystem.

Also, it should be obvious that the disconnect circuitry of the present invention can be utilized with arrays having internal organizations different from the internal structure of the array discussed in the preferred embodiment. For example, the array may have the internal configuration disclosed in the aforementioned U.S. Pat. application Ser. No. 439,677. There, in one embodiment, each array comprises a number of subarrays, each subarray having its own address register and disconnect circuitry. A first disconnect line in the common interconnecting bus could serve to disconnect an entire defective array should it contain a gross defect. A second disconnect line could be connected to the individual disconnect circuitry associated with each subarray, to disconnect a defective subarray from the data out bus. To this end, the simultaneous occurrence of the $MATCH_i$ and ZAP signals would serve to disconnect the $i$th subarray. Other internal array organizations are, of course, possible.

The preferred form of the Disconnect Control Circuit utilizes disconnecting or disabling elements in the form of electrically reprogrammable connective devices, such as PROM's. Other forms of programmable elements such as fusible link devices may be utilized.

Accordingly, it is intended by the appended claims to cover all modifications of the invention which fall within the true spirit and scope of the invention.

What is claimed is:

1. A repairable store having connected thereto, from an external source, means for transmitting an address signal, means for transmitting a data signal, means for transmitting control signals, means for transmitting a disconnect signal, and adapted to receive address and control signals from said external source and to transfer data signals to and from said external source, said store comprising a plurality of basic units of store, each one of said basic units comprising:

- a bus portion including at least one address signal line, a data signal line, a control signal line, and a disconnect signal line, said bus portion interconnecting said plurality of basic units;
- a first means for storing said data signals;
- a second means for storing an address;
- third means connected to said control signal line and responsive to one of said control signals for storing at least one status signal;
- means responsive to said third storage means for selectively enabling said second storage means to store a unique address transmitted over said address signal line;
- means for controlling the transfer of data signals between said data signal line and said first storage means;
- first comparison means responsive to a comparison between address signals received over said at least one address signal line and said stored address for generating a match signal;
- second comparison means responsive to said match signal and a different one of said control signals for actuating said controlling means;
- second means for connecting said at least one address signal line to said first comparison means, for connecting said data signal line to said first storage means, and for connecting said control signal line to said third storage means and said second comparison means; and
- means for disabling said second connecting means in response to said disconnect signal and said match signal to thereby disconnect said one basic unit of store from said signal bus.

2. The repairable store of claim 1, wherein said disabling means comprises a semipermanent voltage-programmable transistor.

3. The repairable store of claim 1, wherein said disabling means comprises a programmable connective device.

4. The repairable store according to claim 1, wherein the number of said plurality of basic units of store is at least as great as the address space of said store and wherein said repairable store further comprises:

- means for transmitting said at least one status signal stored within said third means over said control signal line to each of said basic units which is connected to said store; and
- means associated with said store for enabling one and only one of said third means of said connected basic units to be responsive to said transmitted status signal at any given time, whereby a unique address from the store address space may be assigned to each of said plurality of connected basic units.

5. A repairable store having connected thereto, from an external source, means for transmitting an address signal, means for transmitting a data signal, means for transmitting control signals, and means for transmitting a disconnect signal, and adapted to receive address and control signals from said external source and to transfer data signals to and from said external source, said store comprising a plurality of basic units of store each one of said basic units of store comprising:

- a bus portion including a plurality of address and control signal lines, a data signal line, and a disconnect signal line, said bus portion interconnecting said plurality of basic units;
- switching means;
- first means for storing said data signals;
- second means for storing an address;
- third means for storing a status signal, said third means including enabling means responsive to said status signal for selectively enabling said second storage means to store a unique address transmitted over said address signal lines;
- fourth means for selectively inhibiting the operation of said enabling means, said fourth means being responsive to the contents of said third means and to an inhibit control signal transmitted over a predetermined one of said control signal lines;
- fifth means, associated with said predetermined control signal line, for ordering said one basic unit relative to the other basic units of said store, said fifth means being responsive to the contents of all of said third means of the basic units of higher order than said one basic unit to selectively generate said inhibit control signal over said predetermined control signal line to the basic units of lower order;
- means for comparing said address signals with the contents of said second storage means, said comparing means being responsive to a coincidence between said address signals and said unique stored address to generate a control enable signal;
- sixth means connected to said first storage means and responsive to said control enable signal and to data control signals transmitted over predetermined others of said control signal lines to control the transfer of said data signals between said data signal line and said first storage means;
- second means for connecting via said switching means said address signals to said second storage means and said comparing means, said control signals to said fourth, fifth, and sixth means, and said data signal line to said first storage means; and
- means for disabling said switching means in response to said disconnect signal and said control enable signal to thereby disconnect said one basic unit of store from said signal bus.

6. An integrated-circuit store according to claim 5 wherein said disabling means comprises a programmable connective device.

7. An integrated-circuit store according to claim 5 wherein said disabling means comprises a semipermanent voltage-programmable transistor.

8. An integrated-circuit store according to claim 5 wherein said disabling means comprises a programmable connective device.

* * * * *